No. 864,911. PATENTED SEPT. 3, 1907.
J. M. PADGETT.
VEHICLE WHEEL RIM.
APPLICATION FILED MAY 3, 1906.
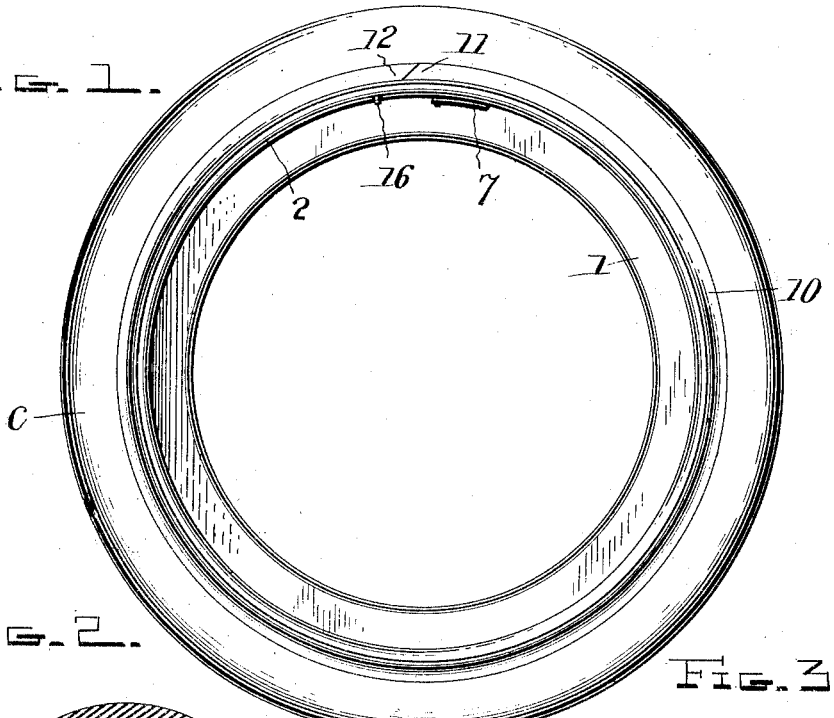
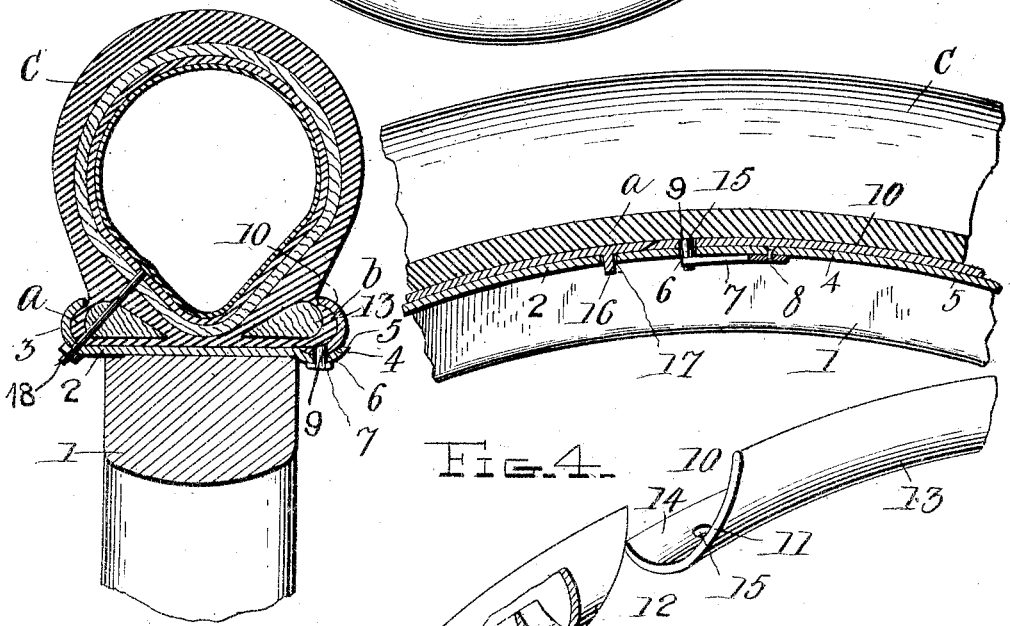
Witnesses
Inventor
James M. Padgett.
by
Attorneys

UNITED STATES PATENT OFFICE.

JAMES MILLARD PADGETT, OF TOPEKA, KANSAS.

VEHICLE-WHEEL RIM.

No. 864,911.

Specification of Letters Patent.

Patented Sept. 3, 1907.

Application filed May 3, 1906. Serial No. 315,037.

*To all whom it may concern:*

Be it known that I, JAMES MILLARD PADGETT, a citizen of the United States, residing at Topeka, in the county of Shawnee and State of Kansas, have invented certain new and useful Improvements in Vehicle-Wheel Rims; and I do declare the following to be a full, clear, and exact description of the invention, such as will enable others skilled in the art to which it appertains to make and use the same.

This invention relates to improvements in automobile and other vehicle wheels which employ pneumatic or solid rubber tires, the object being to provide a rim of improved construction having a detachable clenching flange, which when in position will securely hold the tire in place, and which may be readily removed to permit the tire to be slipped from the rim without injury to the tire, and my invention consists in the construction, combination and arrangement of devices hereinafter described and claimed.

In the accompanying drawings,—Figure 1 is a side elevation of a wheel rim embodying my improvements, showing a pneumatic tire thereon; Fig. 2 is a transverse sectional view of the same; Fig. 3 is a detail longitudinal sectional view of the same; and Fig. 4 is a detail sectional perspective view of the removable clenching flange, showing the ends thereof separated from each other, as when such clenching flange is detached from the wheel.

On the periphery of the felly 1 of the wheel is the rim 2, which is formed at one side with an integral, outwardly-projecting, inwardly-curved, fixed clenching flange 3 to engage the bead $a$ on one side of the pneumatic tire $c$. The opposite side of the rim 2 also projects laterally beyond the felly 1, and is suitably upturned and is concave on its upper or outer side to form an annular, concave groove or channel 4, which lies slightly without the bead $b$ of the tire $c$. The flange 5, in which the said groove or channel is formed is provided with a radial opening 6. On the inner convex side of said flange is secured one end of a spring arm 7, as at 8. The free end of the said spring arm is bent substantially at right angles to provide an integral locking stud 9. The action of the said spring arm is to normally project the point of the said locking stud radially beyond the concave grooved or channeled face 4 of the flange 5, to engage the radial opening 15 in the end 11 of the clenching flange 10, thereby locking the same to the rim 2. I also provide, in combination with such rim 2, a detachable annular clenching flange 10, which is in effect a split ring, the opposing ends of which are beveled, as at 11, 12, and which is curved in cross-section to correspond in shape with the integral clenching flange 3 of the rim to provide the convex outer side 13, which is adapted to fit in the concave groove or channel 4 of the rim flange 5, and the inner concave face or channel 14 adapted to receive the bead $b$ of the pneumatic tire.

It will be observed by reference to Fig. 2 of the drawings, that owing to the outward inclination of the flange 5, the outer edge thereof is radially without the lateral plane of the rim, so that the said flange by its engagement with the said side of the detachable split clenching flange 10, tends to secure the latter in place to enable said detachable clenching flange to resist the lateral thrust of the pneumatic tire. The said clenching flange is provided near the end 11 with a radial opening 15 for engagement by the spring-pressed locking stud 9. Said detachable clenching flange is provided near the end 12 with a hooked-shaped projecting stud 16 to engage an opening 17 in the flange 5 of the rim 2.

It will be understood upon reference to Fig. 3, that the under-cut beveled end 12 of the detachable clenching flange 10 overlaps and bears against the reversely-cut beveled end 11 thereof, preventing the end 11 from springing up and disengaging from the stud 9. The clenching flange may be removed from the rim to permit the tire to be slipped therefrom by first disengaging the spring-pressed locking stud 9 from the opening 15 in the end 11 of said detachable clenching flange. In replacing the detachable clenching flange, the stud 16 on the end 12 thereof is first engaged with the opening 17 in the flange 5 of the rim 2. Said detachable clenching flange is pressed inwardly into the groove or channel 4 of said flange 5, and by means of a suitable tool, the end 11 of said detachable clenching flange is drawn toward the end 12 thereof until the opening 15 registers with the opening 6 in the channel 4 of the rim flange 5, when the stud 9 by the action of the spring arm 7 will enter said openings 15 and 6, thereby locking said end 11 of the detachable clenching flange in place.

To prevent the pneumatic tire from creeping, a suitable number of bolts 18 may be employed, as shown in Fig. 2.

Having thus described my invention, what I claim as new, and desire to secure by Letters-Patent, is,—

In combination with a wheel rim having an annular groove, an annular detachable clenching flange to enter said groove and bear against a tire, said detachable clenching flange being cut to form separable, reversely-beveled ends, one to overlap the other, said ends and the said wheel rim being provided with co-acting studs and stud-receiving openings to lock said clenching flange in place, the stud which secures the underlapping end of the detachable clenching flange being movable and having a spring to normally hold it in locking position.

In testimony whereof I have hereunto set my hand in presence of two subscribing witnesses.

JAMES MILLARD PADGETT.

Witnesses:
W. M. PADGETT,
M. G. LONG.